United States Patent

[11] 3,558,082

[72] Inventor Ralph F. Bennie
6710 Doolittle Drive Edwards AFB, Calif. 93523
[21] Appl. No. 745,200
[22] Filed July 16, 1968
[45] Patented Jan. 26, 1971

[54] ROTARY WING AIRCRAFT
17 Claims, 12 Drawing Figs.
[52] U.S. Cl............................................ 244/17.25,
244/17.11, 244/17.21; 416/21, 416/24, 416/114, 416/132, 416/240
[51] Int. Cl....................................................... B64c 27/72
[50] Field of Search........................................... 244/17, 11,
17.19, 17.21, 17.25, 17.23, 17.27, 17.15, 17.17;
60/39.34, 39.35; 244/6, 7; 170/135.4, 160.1,
160.25, 160.26; 416/21, 24, 114, 132, 240

[56] References Cited
UNITED STATES PATENTS

| | | | |
|---|---|---|---|
| 1,897,092 | 2/1933 | Weir............................ | 416/21 |
| 2,110,563 | 3/1938 | Thaon.......................... | 244/17.11 |
| 2,178,014 | 10/1939 | Brown.......................... | 416/21X |
| 2,410,545 | 11/1946 | Main............................ | 416/114 |
| 2,627,928 | 2/1953 | Mullgardt..................... | 416/240X |
| 2,745,498 | 5/1956 | Nagler.......................... | 416/21 |
| 3,026,942 | 3/1962 | Cresap ......................... | 416/114 |
| 2,667,226 | 1/1954 | Doblhoff....................... | 170/135.4 |
| 2,684,212 | 7/1954 | Vanderlip...................... | 170/135.4X |
| 2,689,011 | 9/1954 | Zakhartchenko............ | 170/135.4X |
| 2,696,267 | 12/1954 | Mouravieff................... | 170/135.4 |
| 2,702,601 | 2/1955 | Nagler.......................... | 170/135.4 |
| 2,761,635 | 9/1956 | Hiller, Jr. et al. ............. | 170/135.4X |
| 2,994,384 | 8/1961 | Stevens ........................ | 170/135.4 |
| 3,010,678 | 11/1961 | Gose ............................ | 170/135.4(UX) |
| 3,032,120 | 5/1962 | Lee et al. ...................... | 170/135.4 |
| 3,144,907 | 8/1964 | Lubben et al................. | 170/135.4X |

Primary Examiner—Milton Buchler
Assistant Examiner—Paul E. Sauberer
Attorneys—George H. Baldwin and Arthur G. Yeager ABSTRACT: The aircraft includes rocket engines mounted on a warpable rotating wing for operating same in a helicopter mode and an engine and propeller mounted on the fuselage for operation of the aircraft in an autogyro mode. Cyclic and collective pitch controls operate through a swash plate, including a flexible membrane, which controls a movable servotab to cause aerodynamic warping of the wing. Thrust vector controls or spoilers are mounted aft of the rocket engines to control the effective thrust therefrom.

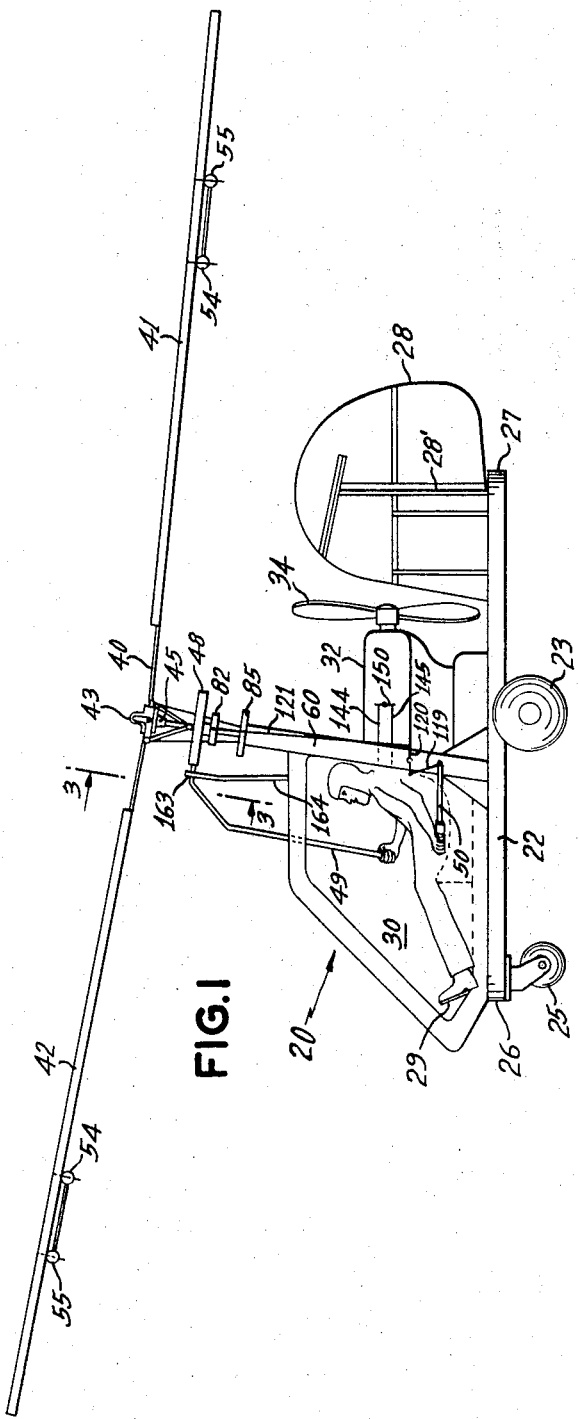
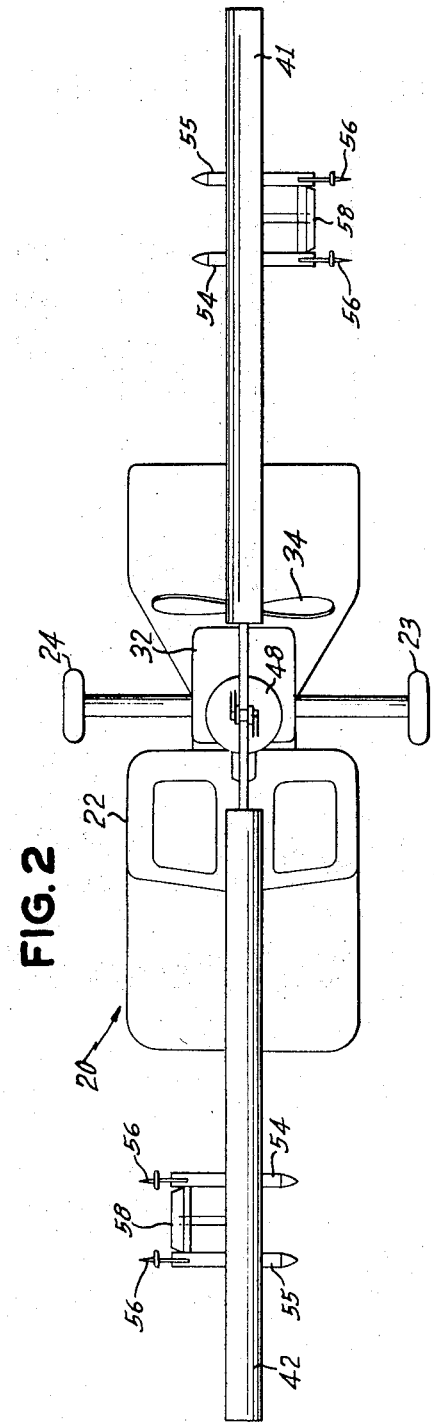

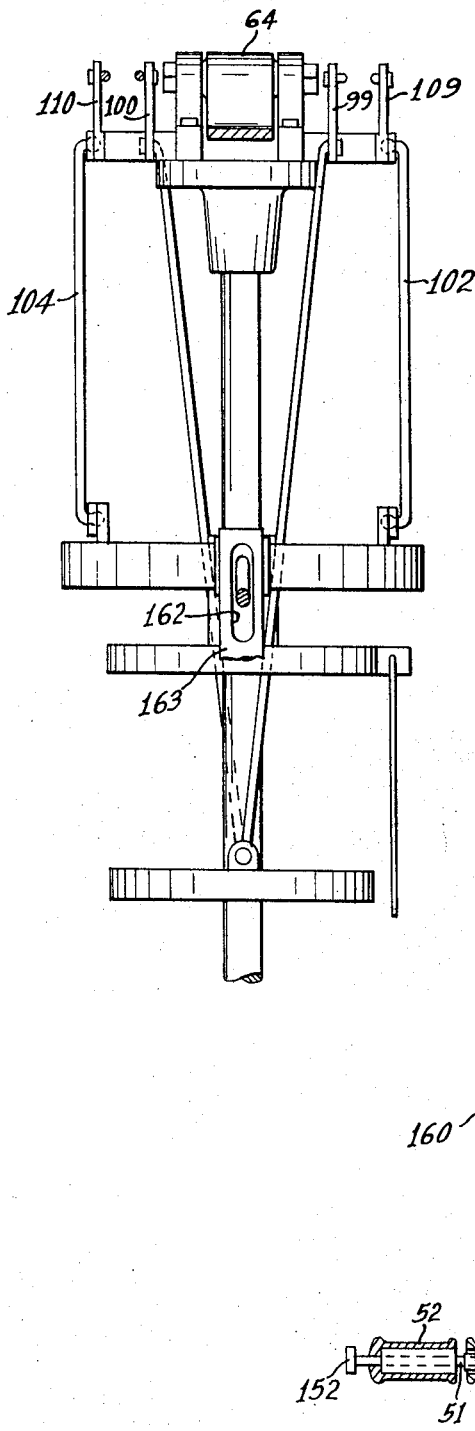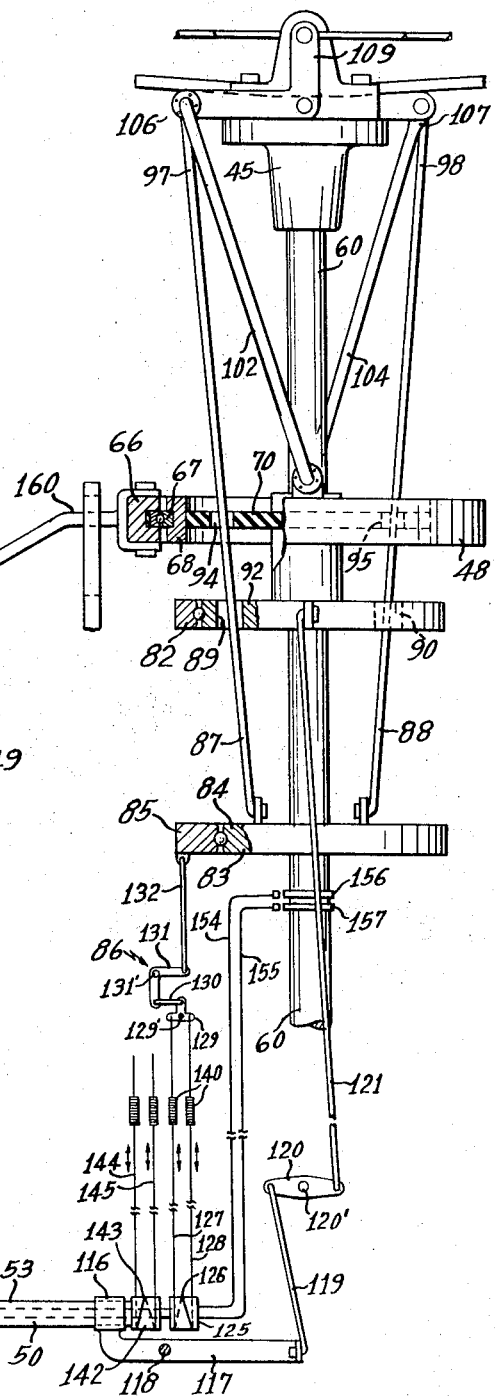

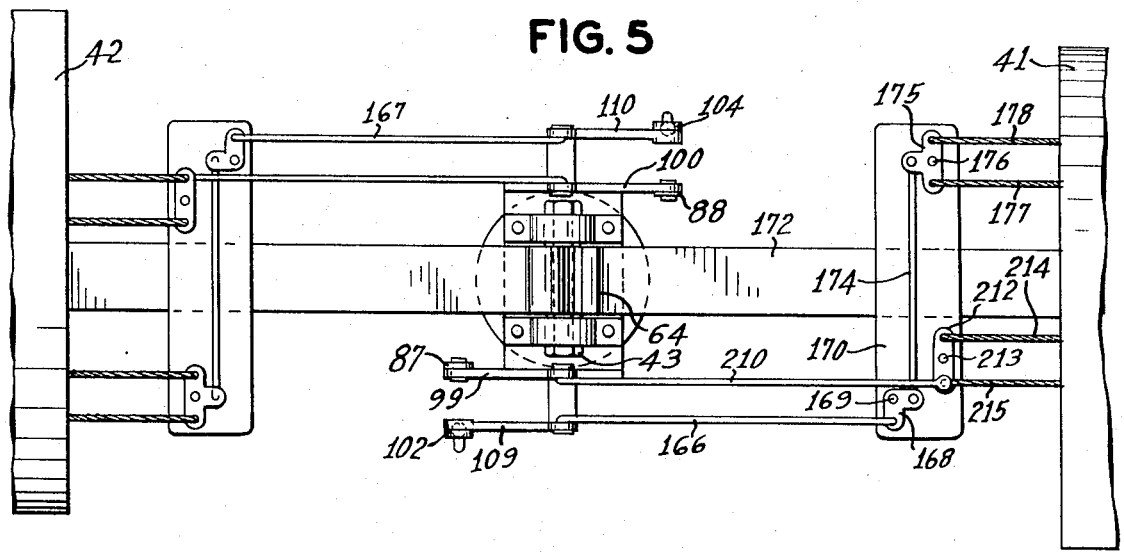
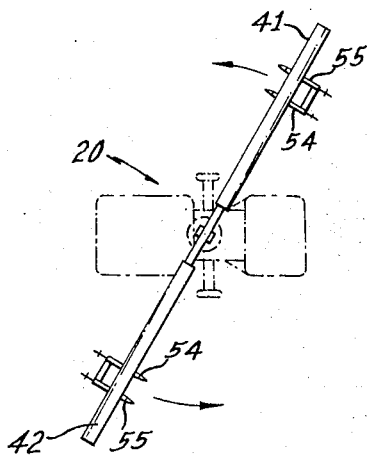
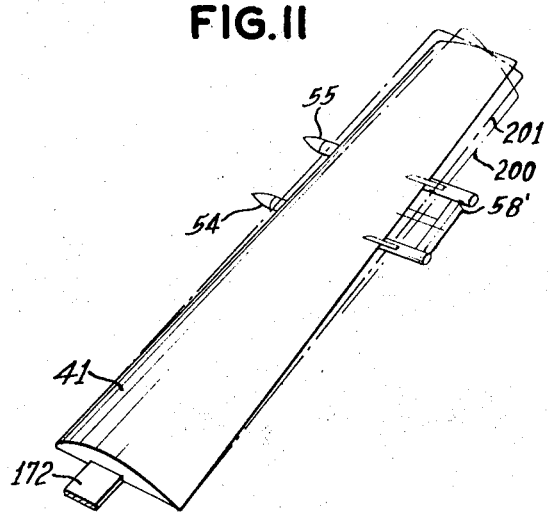
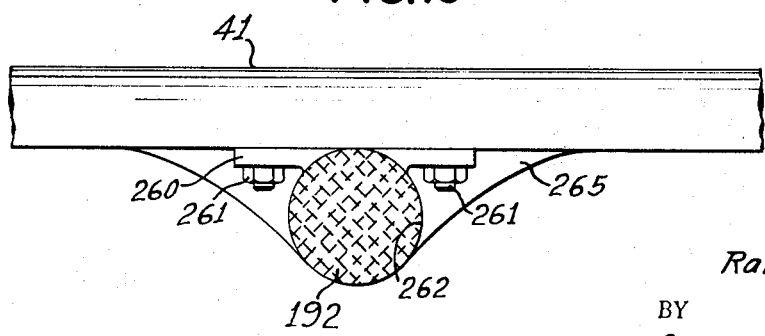

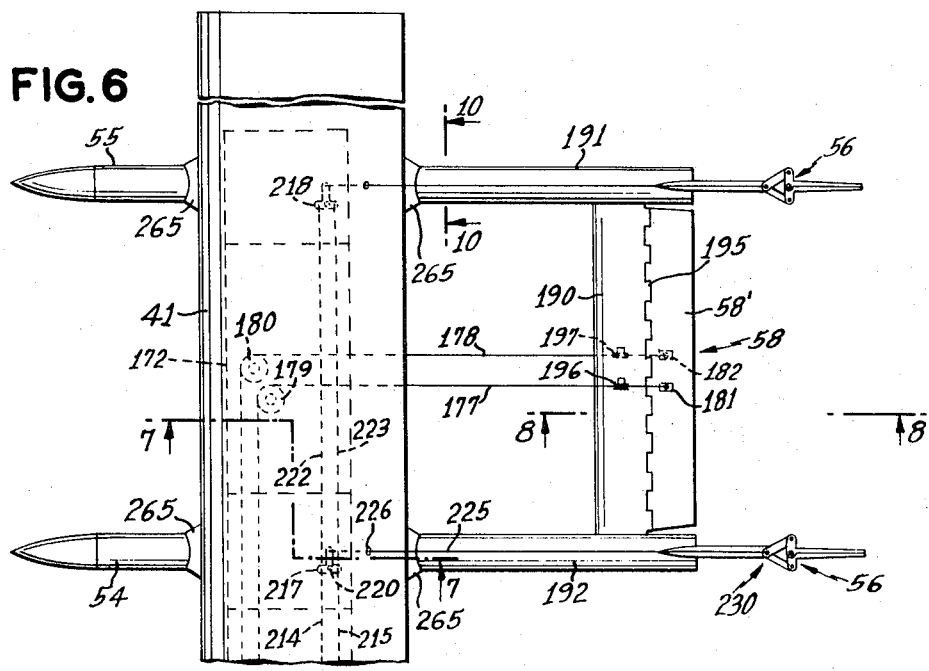
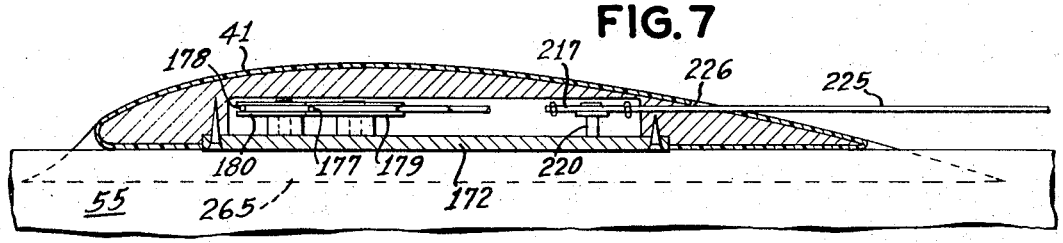
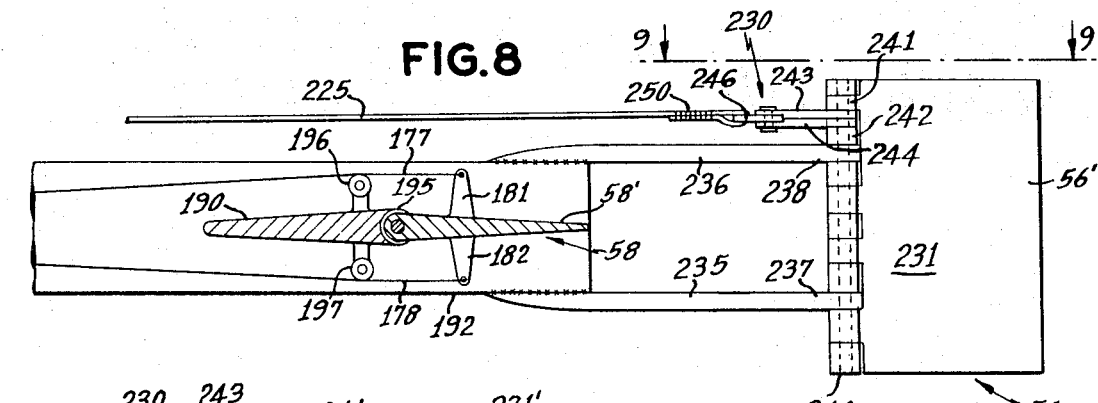
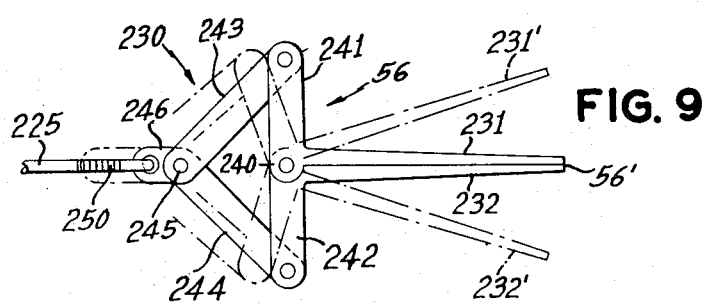

3,558,082

ROTARY WING AIRCRAFT

BACKGROUND OF THE INVENTION

1. Field of Invention

This invention relates to rotary wing aircraft and more particularly to an aircraft capable of vertical and horizontal flight.

The present invention is directed to a rotary wind aircraft which may be defined as a rocket powered helicopter; an aircraft with full helicopter control capabilities including cyclic and collective pitch controls to afford an aircraft that can be flown by the pilot as a helicopter in vertical flight, particularly, during takeoff and a landing, and that can fly as an autogyro in horizontal flight or during takeoff and landing.

2. Description of the Prior Art

There have been several attempts made to combine features of various types of aircraft to afford a more versatile aircraft having greater capabilities. The autogyro described in U.S. Pat. No. 3,149,802 is illustrative of one such attempt in which the resulting aircraft is capable of horizontal flight as an autogyro with nearly vertical takeoff flight features.

Some helicopters have been powered by jet engines and the like mounted on the blades, such as those disclosed in U.S. Pat. Nos. 2,585,468 and 3,010,678, the latter patent also illustrating a solid propellant rocket operable as a booster for the ramjet engines.

SUMMARY OF THE INVENTION

This invention relates to a rotary wing aircraft which may be operated as both a helicopter and an autogyro. The aircraft includes an engine means for forward driving flight thereof and rocket means on the rotating wind for vertical flight thereof. Pitch control means are provided to effect changes in altitude and attitude and means for controlling the direction of the aircraft are also included.

Selectively operable means are disposed aft of the rocket engines to control the effective thrust therefrom thereby controlling rotor or blade r.p.m.

The wing or blades are warpable, and movable servomeans are connected to each blade, which are operable by controlling the cyclic and collective pitch means, through a flexible membrane, which is employed rather than the complex previously used cyclic universal bearing arrangements known in the art, with the flexible membrane of this invention performing all of the necessary functions and operating characteristics which have been previously obtained by the other prior art bearing arrangements.

A general object of this invention is to provide a rotary wing aircraft having the capabilities and operating characteristics of a helicopter and an autogyro.

A related object is the provision of an aircraft in which transitions between helicopter and autogyro modes is readily accomplished with a minimum of flight changes in altitude and attitude.

A particular object is to provide a rotary wing aircraft employing a plurality of rocket engines on the rotary wing to power same for helicopter operation thereof.

A related particular object is the provision of a powering means of on the fuselage of such aircraft for selective autogyro operation of the aircraft.

A specific object is to provide a rotary wing aircraft employing an improved swash plate having a flexible membrane which is simple and inexpensive in construction u yet effective and durable in use.

Other objects include the provision of a very low cost aircraft which is easy to fly, which can be stored in a small space, example, in a garage at home, which can be maneuvered on roads under its own power with the blades thereof stowed, which reduces the drive and control complexities of marketed helicopters and which combines the better features of each of the helicopter and autogyro.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a right side elevational view of the rotary wing aircraft according to the invention;

FIG. 2 is a plan view of the aircraft of FIG. 1;

FIG. 3 is an enlarged sectional view taken along line 3-3 of FIG. 1;

FIG. 4 is an enlarged right side elevational view of a portion of the aircraft shown in FIG. 1, partially broken away for clarity;

FIG. 5 is an enlarged plan view of a portion of the aircraft taken axially of the rotor mast;

FIG. 6 is an enlarged plan view of the rocket portion of the aircraft shown in FIGS. 1 and 2;

FIG. 7 is an enlarged sectional view taken along line 7-7 of FIG. 6;

FIG. 8 is an enlarged sectional view taken along line 8-8 on FIG. 6;

FIG. 9 is a plan view as seen from along line 9-9 of FIG. 8;

FIG. 10 is an enlarged sectional view taken along line 10-10 of FIG. 6;

FIG. 11 is a pictorial view illustrating rotor blade warping; and

FIG. 12 is a plan view of the aircraft with the rocket motors activated causing the aircraft to operate in the helicopter mode.

DESCRIPTION OF THE PREFERRED EMBODIMENT

Referring now more particularly in the drawings, the rotary wing aircraft, is designated 20 in FIGS. 1 and 2, aircraft 20 including an elongated fuselage 22 having landing wheels 23, 24 generally medially thereof and a front wheel 25 adjacent the forward fuselage end 26. At the opposite fuselage end 27 a stabilizer, in the form of a rudder means 28 pivoted about a substantially vertical axis 28', is provided which is in turn controlled by the foot pedals 29 suitably connected to the rudder means 28. The foot pedals 29 are manipulated by the pilot from within the cockpit 30 located between wheels 23, 24 and wheel 25. Engine means in the form of a turboprop of a reciprocating engine 32 is mounted to the fuselage 22 generally between rudder means 28 and cockpit 30 and adjacently above wheels 23 and 24. Engine 32 rotates a pusher propeller 34 during piloting of the aircraft in the autogyro mode, as hereinafter more fully described.

A rotor blade assembly 40 includes a plurality of rotor blades 41 and 42 which are mounted on a teetering axis 43 established by the rotor head 45. Swash plate 48 is controlled by the cyclic pitch control lever 49 manipulated by the right hand of the pilot while the left hand manipulates the collective pitch control lever 50, lever 50 being operatively associated with swash plate 48 for collectively changing the pitch of the rotor blades 41 and 42, as hereinafter more fully described.

Attached to each of the rotor blades 41 and 42 is a plurality of rocket engines 54 and 55, having replaceable solid propellant cartridges (not shown), and aft of each rocket engine is a thrust vector control or spoiler mechanism 56, described more fully in connection with FIGS. 6, 8 and 9. Associated with each blade is a rotor blade warping mechanism 58, herein shown as being mounted to and between the housings of rocket engines 54 and 55. The blade warping mechanism 58 will be more fully described in connection with FIGS. 6, 8 and 11.

Considering FIGS. 3 —5, the shaft or mast 60 is suitably journaled (not shown) in fuselage 22 and the rotor head 45 is mounted at the upper end of mast 60 as known in the art. Blades 41 and 42 are connected to rotor head 45 by teetering hinge connection means 64 which establishes the horizontal flapping axis 43 for the blades. The swash plate 48 is mounted to mast 60 spacedly below rotor head 45, swash plate 48 having a nonrotatable outer casing 66 with a common ball bearing race assembly 67 interposed between outer casing 66 and inner casing 68. Connected to the inner casing 68 of swash plate 48 is a flexible disc membrane 70, membrane 70 being suitably keyed to mast 60 for rotation therewith and being slidable along the mast. Membrane 70 is made of a flexible and resilient material such as rubber, plastic or the like. The flexible membrane in accord with the invention functions in substantially the same manner as the ball and socket or other types of universal joints normally employed in helicopters.

Swashplate 48 is seen to be controlled in the selective tilting thereof by the cyclic pitch control lever 49 and movement upwardly and downwardly along the mast 60 by upward and downward movement of collective pitch control lever 50 which moves collective pitch bearing structure 82 upwardly and downwardly. Spaced below the collective pitch bearing structure 82 is a thrust vector or spoiler bearing structure 83 having an inner race member 84 slidingly supported on mast 60 and mounted thereto for rotation therewith. Outer race member 85 is connected to a control mechanism generally indicated at 86, which controls the upward and downward movement of bearing structure 83. Operating rods 87 and 88 extend upwardly through openings 89 and 90 in the inner race member 92 of collective pitch bearing structure 82 and thence upwardly through openings 94 and 95 in flexible membrane 70 with the upper ends 97 and 98 of rods 87 and 88 being pivotally connected to bellcranks 99 and 100, as seen in FIG. 3, which ultimately control the spoilers 56' of the spoiler mechanism 56. Rods 102 and 104 are universally pivotally connected to the inner casing 68 of swashplate 48 for movement therewith in response to actuation of cyclic pitch control lever 49. The upper ends 106 and 107 of rods 102 and 104 are universally pivotally connected to respective linking means in the form of bellcranks 109 and 110 which ultimately control the servotabs 58' of the blade warping mechanisms 58 of the rotor blades 41 and 42.

The collective pitch control lever 50 includes a solid elongated rod 51 to which handle 52 is secured, rod 51 being telescoped within hollow rod 53 to which handle 115 is affixed. Rod 53 is rotatably journaled within housing 116, such housing being connected to lever arm 117 which is inturn pivotally attached to the fuselage by pivot pin 118 whereby permitting rod 51 to be moved upwardly and downwardly on pivot pin 118 to effect an upward and downward movement of collective pitch bearing structure 82 through suitable link 119, reversing link 120, which is pivotable about pin 120', and link 121. When lever 50 is moved downwardly, the collective pitch bearing structure 82 likewise moves downwardly, and when lever 50 moves upwardly, bearing structure 82 also moves upwardly to thereby collectively vary the pitch of the blades.

Upon rotation of handle 52 and rod 51, spool 125, which is attached to rod 51 adjacent the end thereof opposite from handle 52, rotates and a cable 126 wrapped around spool 125, controls mechanisms mechanism 86. When rod and handle 51 and 52 are rotated clockwise, cable portion 127 moves upwardly and cable portion 128 moves downwardly to pivot the link in the form of a double bellcrank 129 on pin 129', moving link 130 rearwardly, pivoting the link in the form of a bellcrank 131 on pin 131', and moving link 132 upwardly together with the spoiler bearing structure 83. When handle 52 and rod 51 are rotated counterclockwise cable portion 127 moves downwardly pivoting bellcrank 129, link 130 moves forwardly pivoting bellcrank 131 downwardly thereby moving link 132 and spoiler bearing structure 83 downwardly. Springs 140 are provided within cable portions 127 and 128 spacedly between spool 125 and mechanism 86 to permit pivoting of the entire lever 50 about pin 118 which changes and controls the collective pitch bearing structure 82.

Another spool 142 is connected at the hollow rod end opposite from handle 115, and a cable 143 is wrapped therearound with cable portion 144 and 145 controlling the throttle 150 of reciprocating engine 32, as seen in FIG. 1. Thus, the engine throttle is controlled by manipulation of the handle 115 and hollow rod 53 which rotate spool 142 clockwise and counterclockwise thereby controlling the engine throttle 150 in manner well known in the art.

Attached to rod 51 forwardly of handle 52 is a multiple switch control 152 for selective operation of solid propellant rockets 54 attached to each of blades 41 and 42 when the pilot desires to operate the aircraft in the helicopter mode. The other pair of solid propellant rockets 55 respectively on blades 41 and 42 may likewise be selected by the pilot by appropriately positioning selective switch 152. Switch 152 is suitably connected between the power source (not shown) and the igniters (not shown) of the rockets 54 and 55 through electrical lines 154 and 155 connected to slip rings 156 and 157 mounted on mast 60 for rotation therewith. The rockets should be fired in opposite pairs, i.e. one on each of the blades which is either closest to or fartherest from the mast, to preclude rotary unbalance. However, it is preferable to suitably arrange the rocket firing so that if the selected rocket on a particular blade failed to fire, another rocket on the same blade would be fired thereby providing a safety backup for any misfiring.

The cyclic pitch control lever 49 extends upwardly as shown in FIGS. 1, 3 and 4, from the handle 160 to a horizontally extending portion 161 which passes through a slot 162 in frame member 163 affixed to the fuselage by support 164. Lever 49 may be moved forwardly, backwardly or to either side, i.e., may be universally moved to permit proper tilting and/or positioning of swashplate flexible membrane 70 which in turn controls rods 102 and 104 for ultimate control of the servotabs 58'. When the lever 49 is moved forwardly or rearwardly the horizontal portion 161 moves upwardly and downwardly within slot 162 and is limited by the vertical dimension of slot 162. When lever 49 is moved to either side, the horizontal portion 161 rotates within slot 162 thereby repositioning swashplate 48 in the manner desired by the pilot.

When bellcranks 109 and 110 are operated by movement of rods 102 and 104 from appropriate positioning of swashplate 48 through cyclic pitch control lever 49 and collective pitch control lever 50, the bellcranks 109 and 110 operate rods 166 and 167, as seen in FIG. 5, which ultimately operate respective servotabs 58' on blades 41 and 42. Rod 166 is connected to link in the form of a bellcrank 168 which is pivotably connected by pin 169 to a crossarm 170, arm 170 being affixed to spar 172 of the blades. Another link in the form of a double bellcrank 175 is pivotally attached by pin 176 to arm 170, bellcrank 175 being operatively connected to bellcrank 168 by rod 174. Bellcrank 175 controls cables 177 and 178 which extend inwardly of the blade 41, as seen in FIGS. 6 and 7, and around the respective pulleys 179 and 180, cable 177 being connected to upwardly extending horn 181 and cable 178 being connected to downwardly extending horn 182. Servotab 58' supports each of horn 181 and 182 and is moved upwardly by a pulling force on cable 177 which is effected by pivoting of bellcrank 175 clockwise, and tab 58' is moved upwardly by a pulling force on cable 178 which is effected by pivoting of bellcrank 178 in the counterclockwise direction.

Mechanism 58 also includes a nonmovable stabilizer portion 190 which is attached to and between housings 191 and 192 of respective rockets 54 and 55 adjacent the rearward end thereof and spaced rearwardly from blade 41. Stabilizer 190 and servotab 58' are hingedly connected by a substantially, continuous hinge 195. A pair of guiding pulley assemblies 196 and 197 are respectively attached to stabilizer 190 rearwardly of hinge connection 195 with cable 177 and 178 being seated within respective pulleys 196 and 197.

The functioning of the mechanism 58 will best be understood by reference to FIGS. 6, 8 and 11. When these servotabs 58' are moved downwardly to the full-line position shown in FIG. 11 the positive blade pitch is decreased and becomes negative for the aircraft top to operate in the autogyro mode. When the servotab 58' is moved upwardly, the positive blade pitch is increased, as shown by broken lines 200, for operation of the aircraft in the helicopter mode. Broken line position 201 of blade 41 illustrates the neutral or rocket firing position and pitch of the blade which is employed by the pilot for on ground firing of rockets 54 or 55 prior to takeoff in the helicopter mode.

It is to be understood that the particular shapes of servotab 58' and member 190 may be varied depending on various aerodynamic requirements without departing from the invention herein disclosed.

Upon movement of bellcranks 99 and 100 by rods 87 and 88 which connect through spoiler bearing structure 83 (controlled from handle 52 through cable 126 and pulley 125, and mechanism 86), bellcrank 99 operates rod 210 which is connected to link 212, link 212 being pivotally attached by pin 213 to crossarm 170. Cables 214 and 215 are connected to link 212 and operate other links in the form of double bellcranks 217 and 218 within blade 41 adjacently above the respective rockets 54 and 55. Bellcrank 217 is connected to spar 172 by pivot pin 220, bellcrank 217 being pivotable thereabout by forcibly pulling cables 214 and 215 upon pivotable movement of link 212. Bellcrank 218 is connected to bellcrank 217 by respective cables 222 and 223 so that bellcrank 218 and 217 move simultaneously, i.e., upon clockwise and counterclockwise movement of bellcrank 217 the bellcrank 218 respectively moves clockwise and counterclockwise. A rod 225 is connected to bellcrank 217 and extends through an opening 226 in blade 41 generally above rocket 54. Rod 225 is connected to a scissors mechanism generally indicated at 230 for operation of the spoiler vanes 231 and 232 of the spoiler 56'. The spoiler 56' is mounted in alignment with and aft of rocket 54 with arms 235 and 236 being respectively connected to, respectively above and below, rocket housing 192, as shown in FIG. 8. The outer arm ends 237 and 238 are hingedly connected by hinge means 240 to the vanes 231 and 232. The scissors mechanism 230 comprises a laterally extending arm 241 connected to vane 231 and a laterally extending arm 242 connected to vane 232 with respective links 243 and 244 being pivotally attached to arms 241 and 242 and being pivotally attached together by pivotable connection 245, which is in turn connected by tab 246 to the end 250 of rod 225. When rod 225 is pulled by counterclockwise movement of bellcrank 217, vanes 231 and 232 move into an open position, illustrated by broken lines 231' and 232', to spoil or divert the rocket thrust from the generally straight and perpendicular thrust direction with respect to the longitudinal axis of the blades 41 and 42 to diverging angles with respect to such perpendicular thrust direction which decreases or spoils the effective thrust of the rocket.

With rocket 54 operating and the spoiler 56 in the full-line position shown in FIG. 8 and 9, the full thrust of the rocket is diverted generally perpendicularly with respect to the longitudinal axis of blades 41 and 42, and the blades rotate with full power. When it is desired to decrease the effective thrust of the rocket 54, rod 225 is pulled a predetermined amount by proper twisting of handle 52 by the pilot which operates scissors mechanism 230 to cause the vanes to be spread apart in the broken line positions indicated by 231' and 232' thereby diverting a portion of the thrust in a direction generally along the blade. The effective thrust for rotating the blade by the rockets is thus reduced by the diverging vanes 231' and 232'. The spoilers are primarily used anytime a reduction in rocket power is desired or becomes necessary to prevent rotor overspeed for the corresponding amount of collective pitch employed. The spoilers are often used after takeoff in the helicopter mode prior to burn out thereof as well as during descent in the helicopter mode. Normally, the spoilers would be in the full thrust position prior to operating the i aircraft in the autogyro mode.

FIG. 10 illustrates the manner of attaching the rocket housing 192 to blade 41. A support plate 260 is welded to the rocket housing 192, plate 260 being attached to the metal spar 172 of the blade by bolt and nut assemblies 261. Spar 172, as known in the art, may form the bottom surface of blades 41 and 42 or may be totally internal of the outer skins of blades 41 and 42. A pocket 262 is formed beneath the blade for each of the rockets 54 and 55 by a suitable fairing 265 beneath the blade as illustrated in FIGS. 7 and 10. The entire rocket housing may be suitably replaced by another rocket housing, when desired, by disconnecting bolt and nut assemblies 261 and disconnecting the electrical connection (not shown) to the igniter (not shown) within the rocket and then by reconnection thereof to the other rocket housing. It is important that the rockets employed on the blades 41 and 42 be of a small and streamlined profile to minimize the drag caused thereby and to permit the blades to be rotatable in the autogyro mode. Large profile rockets, jets, turbines and the like would normally present too great a drag on the blades for autogyro operation of the aircraft.

FIG. 12 is a plan view of the aircraft with one pair of the rockets either 54 or 55 in fired condition to rotate blades 41 and 42 in the helicopter mode with the blades 41 and 42 in the generally neutral position 201 for the blades as shown in FIG. 11.

It is to be understood that aircraft 20 could be provided with additional components such as gyro stabilizer bar and controls therefor, if desired, with appropriate modifications being made in the rod connections 102 and 104 between swashplate 48 and bellcranks 109 and 110.

The aircraft may takeoff, if desired, in the autogyro mode. Thus, takeoff may be accomplished by using the engine 32 and propeller 34 for forward propulsion rolling on the landing wheels 23 — 25 causing the rotary blade assembly to rotate in the manner of an autogyro, the cyclic and collective pitch control levers 49 and 50 being manipulated to effect the appropriate negative blade pitch for the blades 41 and 42. The directional control for the aircraft is provided by the pilot operating the foot pedals 29 to control the rudder means 28.

If the runway for the aircraft 20 is not sufficiently long to permit the pilot to make a takeoff in the autogyro mode the pilot may ascend in a substantially vertical direction with the aircraft 20 operating in the helicopter mode. Engine 32 should be idling, during the takeoff in the helicopter mode, so that a slipstream is provided by the propeller 34 with rudder 28 in such slipstream for directional control of the aircraft in the mode. The pilot selects one of the two pair of rockets, such as pair 54, on blades 41 and 42 and, by means of switch 152, ignites the selected pair of rockets to cause blades 41 and 42 to rotate, and, when the blades obtain sufficient speed, the pilot changes the pitch of the blades, by appropriate manipulations of collective pitch condition control lever 50, from neutral, or possibly a negative pitch condition, to one of increasing positive pitch to effect vertical takeoff. Once the aircraft has reached the desired altitude and when it is desired to operate the aircraft 20 in the forward direction, engine 32 and propeller 34 are activated by the pilot. By this time, normally, the rockets which were originally fired will be completely, or nearly completely, spent, and by decreasing the positive pitch of the rotor blades and controlling the attitude of the fuselage as the aircraft gains forward speed, the operation is changed from the helicopter mode to autogyro mode.

The above operations are not intended to be necessarily performed in the order mentioned, but are only illustrative of the manner of operating aircraft 20 in the autogyro mode after takeoff in the helicopter mode. Thus the change from one to the other mode of flight may be more or less gradual, and forward speed may be provided by the engine even while power from the rockets is being supplied to the rotor. While in a normal helicopter mode takeoff it will be desirable to make full use of the total power in the pair of rocket which have been ignited to cause the aircraft to rise to maximum altitude, the spoilers 56 may be operated to reduce the net rocket thrust and, if necessary, thus to limit the rotor speed, for example, or to manage a landing immediately following the takeoff.

Upon failure of the reciprocating engine 32 in flight, the aircraft would require that some amount of forward airspeed be maintained to provide directional control of the aircraft by the rudder 28.

During flight in any mode roll and pitch of the fuselage are controlled by the cyclic pitch control of the rotor blades. The rudder controls the yaw of the aircraft while the collective pitch and/or rocket spoiler controls the altitude and rotor spin.

Aircraft 20 may land in the autogyro mode in a manner well known in the art if there is sufficient runway available for such landing. However, should it be desired to effect a vertical descent and landing into a restricted area, or onto rough terrain, assuming the aircraft 20 to be then operating in the autogyro mode, engine 32 is throttled, the pitch of blades 41 and 42 is changed from the negative pitch condition toward a neutral pitch condition, switch 152 is operated to ignite a pair of rockets, such as pair 55, on blades 41 and 42, the blade pitch of each blade is increased in positive pitch, the spoilers 56 are operated to decrease the effective thrust of the rockets thereby slowing down the rotation of blades 41 and 42 and/or the pitch of blades 41 and 42 is decreased, i.e. made less positive, to effect an appropriate vertical landing of the aircraft 20 in the helicopter mode. By appropriate control of rotor speed, which is responsive, of course, both to the blade pitch and the net power being supplied by the rockets, as controlled by the spoilers, the rate of descent may be regulated and altered as desired.

While it is contemplated that vertical descent will normally be accomplished with a pair of rockets ignited and providing power and the reciprocating engine idling to provide directional control by the rudder, a vertical landing may be made in an emergency without rocket power by controlling blade pitch and such landing would entail some loss of directional control; however, total destruction of the aircraft should not occur since the kinetic energy of the rotor system can be counteracted prior to impact by increasing the collective pitch of the blades. If all engines fail, an autorotative landing can be made at 15 to 20 knots forward speed in a manner known in the art.

With two pairs of rockets as shown, it will be apparent that, if a takeoff has been in autogyro mode, the two pairs of rockets remain unused, thus permitting certain alternatives in cases of subsequent emergencies. For example, if one pair of rockets is exhausted in attempting a helicopter mode landing which proves impossible, the other pair of rockets may be ignited to permit the aircraft to regain altitude quickly. If such emergencies are expected to be frequent, it is contemplated that three or more pairs or rockets would be provided. Furthermore, with two pairs of rockets, if the aircraft 20 has taken-off in the autogyro mode, the aircraft would be provided with the capabilities of landing in the helicopter mode and thereafter effecting takeoff in the helicopter mode from the new landing area for returning and landing in the original takeoff area in the autogyro mode.

While each rocket is shown as provided with a respective spoiler, it may be desired to omit spoilers for one of the two pairs or rockets, or for one of two pairs if three pairs are provided. The rockets not equipped with spoilers may be used for takeoffs, the spoilers being much more important during landing maneuvers.

While only a certain preferred embodiment of this invention has been shown and described by way of illustration, many modifications within the true spirit and scope of this invention and within the following claims will occur to those skilled in the art.

I claim:

1. In a rotary wing aircraft comprising a fuselage, selectively operable engine means mounted on said fuselage for forward driving flight of the aircraft in the autogyro mode for takeoff or landing in large areas or normal translational flight, a rotor having a mast mounted on said fuselage and a plurality of elongated blades extending outwardly and generally horizontally from said mast, pilot controlled means for controlling the pitch of said blades between a substantial positive pitch and a pitch substantially negative with respect thereto for flying the aircraft in the helicopter and autogyro modes respectively, selectively operable solid propellant rocket engines mounted on at least two of said blades for driving said rotor and flying said aircraft in the helicopter mode for takeoff or landing in small areas, and means for controlling the direction of the aircraft in forward flight.

2. In the rotary wing aircraft as defined in claim 1 wherein said means for controlling the pitch of said blades includes collective pitch means for simultaneously changing the pitch of said blades to control the altitude of the aircraft, said means for controlling the pitch of said blades further includes cyclic pitch means for changing the pitch of respective said blades to control the attitude of the aircraft.

3. In the rotary wing aircraft as defined in claim 1, further comprising selectively operable nonconstrictive means disposed aft of said rocket engines for controlling the speed of rotation of said blades during operation and nonoperation of said rocket engines and for controlling the effective rocket thrust of said rocket engines during operation of said rocket engines whereby rotor overspeed is prevented during rapid descents of the aircraft and primarily during landing of the aircraft in the helicopter mode.

4. In the rotary wing aircraft as defined in claim 1 wherein said engine means is idling during flying of said aircraft in the helicopter mode to provide a slipstream, said means for controlling the direction of the aircraft including a rudder disposed in said slipstream, said rudder being effective to control the direction of the aircraft in vertical flight.

5. In the rotary wing aircraft as defined in claim 1 wherein said blades are warpable, said means for controlling the pitch effecting changes in the warping of said blades to vary the pitch thereof.

6. In the rotary wing aircraft as defined in claim 5 wherein said means for controlling the pitch includes collective pitch means for simultaneously changing the warping of said blades to vary the pitch thereof and cyclic pitch means for changing the warping of respective said blades to control the attitude of the aircraft.

7. In the rotary wing aircraft as defined in claim 5 wherein said means for controlling the pitch includes cyclic pitch means for controlling the pitch of respective said blades to effect change in the attitude of the aircraft, said cyclic pitch means further controlling the warping of respective said blades to vary the pitch thereof.

8. In the rotary wing aircraft as defined in claim 5 further comprising movable means connected to each said blade and operable by changes of said means for controlling the pitch, said movable means being effective to aerodynamically warp said blades to vary the pitch thereof during rotation of said blades.

9. In the rotary wing aircraft as defined in claim 8 wherein said means for controlling the pitch includes cyclic pitch means for controlling the pitch of respective said blades to effect change in the attitude of the aircraft, said movable means being movable upon control of said cyclic pitch means for varying the aerodynamic warping of said blades.

10. In a rotary wing aircraft comprising a fuselage, engine means mounted on said aircraft for forward driving flight of the aircraft in the autogyro mode for takeoff or landing in large areas or normal translational flight, a rotor including a mast mounted on said fuselage and a plurality of warpable blades attached to said mast and extending outwardly and generally horizontally from said mast, cyclic pitch means for cyclically controlling the pitch of respective said blades to effect change in the attitude of the aircraft, collective pitch means for simultaneously imparting pitch changes to said blades to effect change in the altitude of the aircraft, said collective pitch means being operable to change the pitch of said blades between positive pitch and negative pitch for flying the aircraft in the helicopter and autogyro modes respectively, movable means connected to each said blade and operable by control of said cyclic pitch means and collective pitch means for aerodynamically warping said blades to vary the pitch thereof during rotation of said blades, selectively operable solid propellant rocket engines mounted on at least two opposed said blades for driving said rotor and flying said aircraft in the helicopter mode for takeoff or landing in small areas, and means for controlling the direction of the aircraft in forward flight.

11. In the rotary wing aircraft as defined in claim 9, further comprising selectively operable nonconstrictive means disposed aft of said rocket engines for controlling the speed of rotation of said blades during operation of said rocket engines and for controlling the effective rocket thrust of said rocket engines during operation of said rocket engines whereby rotor overspeed is prevented during rapid descents of the aircraft and primarily during landing of the aircraft in the helicopter mode.

12. In the rotary wing aircraft as defined in claim 9 wherein said engine means is idling during flying of said aircraft in the helicopter mode to provide a slipstream, said means for controlling the direction of the aircraft including a rudder disposed in said slipstream, said rudder being effective to control the direction of the aircraft in vertical flight.

13. In the rotary wing aircraft as defined in claim 9 wherein said cyclic pitch means includes a swashplate having an inner portion rotatable with and slidable with respect to said mast and a nonrotatable outer portion, a first lever attached to said outer portion for tilting said swashplate thereby cyclically controlling the pitch of respective said blades, said collective pitch means includes a member having an inner portion rotatable with and slidable with respect to said mast and a nonrotatable outer portion, a second lever attached to said outer portion of said member for sliding said member upwardly and downwardly on said mast during rotation of said mast, said member inner portion being operatively associated with said swashplate inner member to move same upwardly and downwardly thereby collectively setting and controlling the pitch of said blades.

14. In the rotary wing aircraft as defined in claim 13 wherein said swashplate inner portion includes a flexible membrane universally bendable for universal cyclic control of the pitch of respective said blades upon appropriate manipulations of said first lever.

15. In a rotary wing aircraft comprising a fuselage, a rotor having a mast mounted on said fuselage and a plurality of elongated blades extending outwardly and generally horizontally from said mast, cyclic pitch means for cyclically controlling the pitch of respective said blades to effect change in the attitude of the aircraft, said means including a swashplate having rotatable and nonrotatable portions, a first lever attached to said nonrotatable portion for tilting said swashplate thereby cyclically controlling the pitch of respective said blades, said swashplate rotatable portion includes a flexible membrane responsive to tilting of said swashplate by said lever, a pair of rods spacedly attached to said flexible membrane, said rods being responsive to bending movements of said membrane caused by tilting of said swashplate, and means attached to said rods and responsive to movements thereof to effect changes in pitch of respective said blades.

16. In the rotary wing aircraft as defined in claim 15 further comprising collective pitch means for simultaneously imparting pitch changes to said blades to effect change in the altitude of the aircraft, said collective pitch means includes a member having an inner portion rotatable with respect to said mast and a nonrotatable outer portion, said collective pitch means further including a second lever attached to said member outer portion for sliding said member upwardly and downwardly on and during rotation of said mast, said member inner portion being operatively associated with said flexible membrane to move same upwardly and downwardly thereby collectively setting and controlling the pitch of said blades.

17. In a rotary wing aircraft comprising a fuselage, selectively operable engine means mounted on said fuselage for forward driving flight of the aircraft in the autogyro mode for takeoff or landing in large areas or normal translational flight, a rotor having a mast mounted on said fuselage and a plurality of elongated blades extending outwardly and generally horizontally from said mast, pilot controlled means for controlling the pitch of said blades between a substantial positive pitch and a pitch substantially negative with respect thereto for flying the aircraft in the helicopter and autogyro modes respectively, selectively operable rocket engines having exhaust thrust outlets on at least two of said blades for driving said rotor and flying said aircraft in the helicopter mode for takeoff or landing in small areas, and means for controlling the direction of the aircraft in forward flight, selectively operable nonconstrictive means disposed aft of said rocket engines for controlling the speed of rotation of said blades during operation of said rocket engines and for controlling the effective rocket thrust of said rocket engines during operation of said rocket engines whereby rotor overspeed is prevented during rapid descents of the aircraft and primarily during landing of the aircraft in the helicopter mode.